(12) United States Patent
Hai

(10) Patent No.: US 6,298,645 B1
(45) Date of Patent: Oct. 9, 2001

(54) UNIVERSAL FRUIT-PICKING TOOL

(76) Inventor: Pham Xuan Hai, Weinbergstr. 3A-DE, 66482 Zweibruecken (DE)

( * ) Notice: Subject to any disclaimer, the term of this patent is extended or adjusted under 35 U.S.C. 154(b) by 0 days.

(21) Appl. No.: 09/390,747

(22) Filed: Sep. 7, 1999

(51) Int. Cl.$^7$ ............................................. A01D 46/00
(52) U.S. Cl. ............................. 56/328.1; 56/330; 56/332
(58) Field of Search ......................... 56/328.1, 329, 56/334, 331, 340.1, 327.1, 330, 332, 335, 339; 47/1.01 R

(56) References Cited

FOREIGN PATENT DOCUMENTS

| 129358 | * | 3/1932 | (AT) | 56/334 |
|---|---|---|---|---|
| 209799 | * | 4/1933 | (AT) | 56/339 |
| 76644 | * | 5/1917 | (CH) | 56/336 |
| 186470 | * | 9/1936 | (CH) | 56/335 |
| 281663 | * | 7/1952 | (CH) | 56/334 |
| 101331 | * | 11/1897 | (DE) | 56/336 |
| 132737 | * | 4/1933 | (DE) | 56/335 |
| 52176 | * | 9/1936 | (DK) | 56/327 |
| 500332 | * | 12/1919 | (FR) | 56/336 |
| 763569 | * | 11/1933 | (FR) | 56/334 |
| 787635 | * | 9/1935 | (FR) | 56/336 |
| 521908 | * | 6/1940 | (GB) | 56/334 |
| 2198024 | * | 6/1988 | (GB) | 56/332 |
| 472855 | * | 7/1952 | (IT) | 56/335 |
| 532567 | * | 8/1955 | (IT) | 56/332 |
| 135361 | * | 4/1952 | (SE) | 56/335 |

* cited by examiner

Primary Examiner—Robert E. Pezzuto
Assistant Examiner—Árpád Fábián Kovács
(74) Attorney, Agent, or Firm—John C. Thompson

(57) ABSTRACT

A universal fruit-picking tool including a cage of a generally elliptical spheroid shape having a three-dimensional triangular opening in its upper half fitted with four cutters. Each cutter has a V-shaped gathering and cutting slot of unique design. The cage is supported by a tele-handle. The complex structure of the cage and cutters allows the new device to easily pick and, at the same time, safely catch the fruits, whatever the position of the tele-handle and the opening, which turn arbitrarily in three-dimensional coordination as the user desires. The general structure of the device is rigid, it does not dangle, it is aerodynamically shaped and agile and therefore it is possible to direct and push the device into the crown of fruit trees among close twigs, small branches and leaves in order to pick fruits easily.

7 Claims, 2 Drawing Sheets

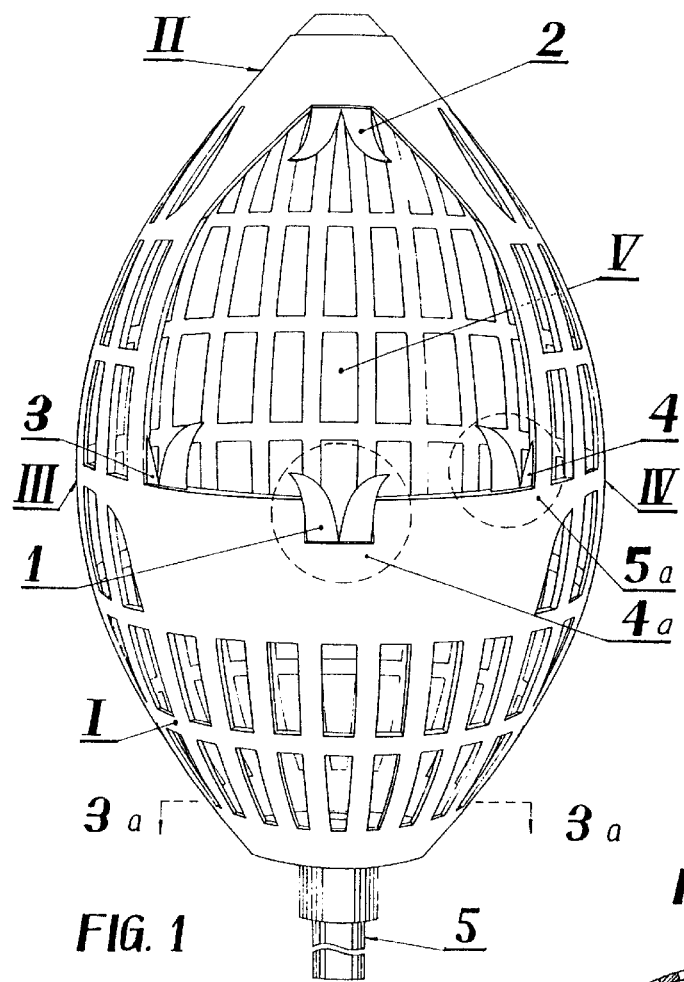
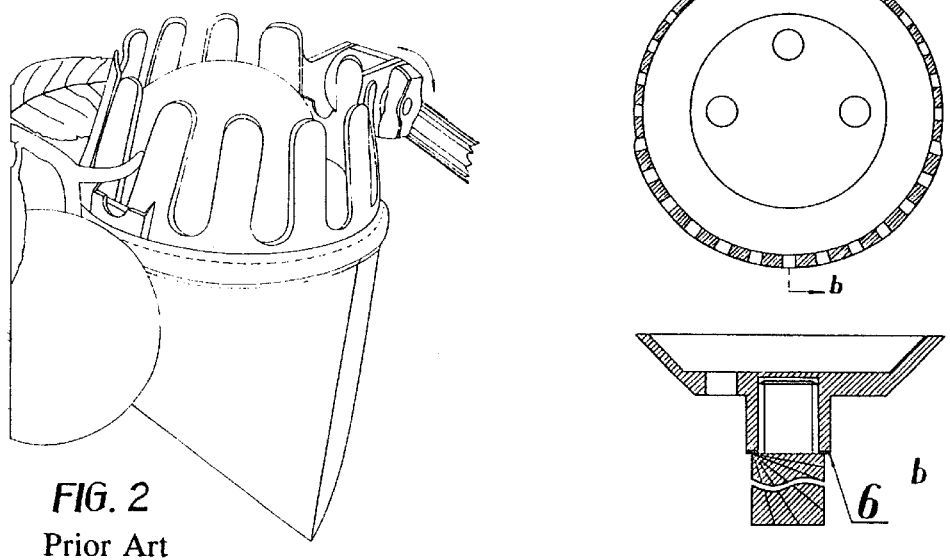
FIG. 1
FIG. 2
Prior Art
FIG. 3

UNIVERSAL FRUIT-PICKING TOOL

BACKGROUND OF THE INVENTION

This invention concerns a hand-operated tool for use in horticulture to pick fruit, for examples, cherries.

Many kinds of fruits have to be picked. There is an increasing number of amateur and professional gardeners. The more civilized and the more clumsy man becomes, the lazier he gets when it comes to climbing trees or ladders, or even to moving. The demand for fruit-picking by means of hand-operated tools is constantly on the increase. At present there is only one kind of rather unsuitable device for fruit picking, or, to be more exact, for apple-picking.

One major difficulty is that they include bags which dangle, are unwieldy and are not aerodynamically shaped, therefore they cannot cope with such obstructions as close twigs, small branches and the leaves in the crown of the tree. Since these are, structurally speaking, akin to landing nets they will be referred to as "landing nets" for clarity of illustration.

A second difficulty is that the structure of the opening and bag of the "landing net" make tedious work. The old devices have a single flat opening, a single hanging bag and a single picking knife or blade. The structure means fruit-picking and catching can only be effected from one position.

A third difficulty is that the "landing net" is not mounted co-axially to the shaft (handle or pole) (FIG. 2). Therefore, it must be inclined so that its opening and the shaft form an angle of 30 degrees. This structure both makes the "landing net" unwieldy and demands of its user considerable agility to hold it in an optimal position for the fruit to be picked. There is an optimal position of the shaft when the shaft inclines upward at an angle of 60 degrees. In this position, the bag hangs down vertically just under the opening, the latter opens at its widest, and the bag swells out the most. In a word, this position is quite suitable for picking fruits. The more or less the shaft is inclined, the smaller the bag gets, the narrower the opening becomes and the more difficult the fruit-picking.

There are two crucial positions of "landing nets" when the shaft is absolutely vertical or is at an angle of 60 degrees from the horizontal. In these cases, the opening inclines upward at an angle of 60 degrees or downward at an angle of 90 degrees. It is most probable that the fruits will fall out of the opening.

Sometimes the fruits to be picked are to the left or to the right of the opening and the position required to pick them can only be achieved by turning the opening 90 degrees clockwise or anti-clockwise. There is no way that the "landing nets" can function in this situation, because with a 90 degrees sideways inclination of the opening, the fruits will all fall out.

These disadvantages of "landing nets" can be incredibly frustrating for the user should he be hindered in his movement on normal ground or if he is in a fruit tree or on a ladder or should the fruit tree be on a bank leaning over water.

A fourth difficulty is that the opening of the "landing nets" cuts the stems by means of a knife or single blade. Knife-cutting requires a sufficient reactive force on the part of the object being cut. However, fruit stems and small branches of most fruit trees can bend to some extent. The reactive force they supply is not sufficient for them to be cut. Therefore, only heavy fruit, such as apples, can be picked by using "landing nets" and that with some difficulty. Such "landing nets" are not suitable for picking cherries, grapes, etc.

A fifth difficulty is that the bag of the "landing nets" is made of fabric. Cloth easily gets dirty and saturated with water. Care must be taken to wash it. It is troublesome.

For the above-mentioned reasons, the previous inventions became impracticable and died prematurely. The eldest and most simple tool for fruit-picking among them has been adapted and is used nowadays as mentioned above in the case of "landing nets".

BRIEF SUMMARY OF THE INVENTION

This invention is intended as a universal fruit-picking tool for use in horticulture. The object of the present invention is to provide a most practical universal fruit picking tool to pick cherries and all kinds of other fruits.

The new device comprises a plastic cage of an elliptical spheroid shape. The plastic cage is formed of five assembled baskets having a common opening. The lower half of the cage is closed and the upper half of the cage is three-quarters closed leaving a gap, hereafter referred to as the opening. The opening is nearly an equilateral triangle and its edges have on them four built-in cases or cutter receiving receptacle for reception of cutters: one case formed at the top apex near to the top of the cage, two other cases formed at the two other apexes at the midpoint (top to bottom) of the housing of the cage and the fourth case formed at the middlemost point along the lower edge of the opening.

The universal fruit-picking tool is equipped with four pairs of cutters which are made of four sheets of razor silver steel provided at one end with a shearing and gathering slot and at the other end with a base portion. They are inserted with their base portions into the built-in cases on the edges of the opening, operable to more simply, more easily and more practically shear the cherry (or fruit) stems than by use of installed normal scissors, owing to a very acute shearing angle α of 10 degrees formed by the two sharp shearing edges at the narrowest part of the shearing slot.

The cage has at its bottom end a built-in bolt nut for combination with a built-in bolt on the head of the tele-handle. The combination is secured against coming off by a leaf spring washer.

The complex structure of the plastic cage allows the new device to easily pick and safely catch the fruit, whatever the position of the tele-handle with the cage turning arbitrarily to any required position with the opening appropriately placed to pick and catch the fruit as its user desires.

The general structure of the new device is rigid, it does not dangle, it is aerodynamically shaped and agile and thus it is possible to direct and push the new device into the crown of the fruit tree coping with such obstructions as close twigs, small branches and leaves, to pick cherries and all kinds of other fruits easily.

BRIEF DESCRIPTION OF THE DRAWINGS

FIG. 1 is a perspective view of the universal fruit-picking tool of the invention for use in horticulture to pick cherries and all kinds of other fruits.

FIG. 2 is a scaled-down perspective view of a prior art device located in the position of picking apples.

FIG. 3a is a sectional view taken along the line 3a—3a of FIG. 1, showing the irregularity of thickness of the walls of the plastic cage.

FIG. 3b is a sectional view taken along the line b—b of FIG. 3a, showing the built-in bolt and nut and fixing leaf spring washer 6.

FIG. 4a is a sectional view taken from position 4a of FIG. 1.

FIG. 4b is a sectional view taken along the line b—b of FIG. 4a.

FIG. 4c is a plane view of a cutter taken from FIG. 4a.

FIG. 4d is a sectional view taken along the line d—d of FIG. 4c.

FIG. 4e is a sectional view taken along the line e—e of FIG. 5c.

FIG. 4f is a rear view of the cutter taken from FIG. 4c.

FIG. 5a is a sectional view taken from position 5a of FIG. 1.

FIG. 5b is a sectional view taken along the line b—b of FIG. 5a.

FIG. 5c is a plane view of the right cutter 4 taken from FIG. 5a.

FIG. 5d is a sectional view taken along the line d—d of FIG. 5c.

FIG. 5e is a sectional view taken along the line e—e of FIG. 5c.

FIG. 5f is a rear view of the right cutter 4 taken from FIG. 5c.

DETAILED DESCRIPTION OF THE INVENTION

Referring to FIG. 1, a universal fruit-picking tool is used to pick cherries and all kinds of other fruits.

The universal fruit-picking tool has a plastic cage of a generally elliptical spheroid shape. It is made to be mounted coaxially to the head of a tele-handle. The cage is made of five assembled baskets: the lower (I), the upper (II), the left (III), the right (IV), and the horizontal (V) parts. They are so-called after the different manners in which they function in catching the fruit.

The five assembled baskets, i.e. the cage, have a common opening: The lower half of the cage is closed and the upper half of the cage is three-quarters closed leaving a gap, hereafter referred to as the opening. The opening is nearly an equilateral triangle with the top apex near to the top of the cage, two other apexes at the midpoint (top to bottom) of the side of the cage. There are four built-in cases or cutter receiving receptacles, three of them formed at the three corners of the equilateral triangle-like opening and the fourth one formed at the middlemost point along the lower edge of the opening for reception of four pairs of cutters which are made of four sheets of razor silver steel with their stems or base portions inserted into their built-in cases on the edges of the opening on the upper half of the cage. Each of these cutters is provided with a generally V-shaped gathering and shearing slot at the end opposite the base portion. These cutters are operable to more simply, more easily and more practically shear cherry stems than by use of scissors, owing to a very acute shearing angle α of 10 degrees (FIG. 4c) formed by the two sharp shearing edges at the narrowest part of the shearing slot, and, at the same time, capable of easily trapping the fruit stems owing to a wide trapping angle β of 65 degrees (for cutters 1, FIG. 4C) and 55 degrees (for cutters 3 and 4). The gathering portion is formed by the two convex blunt edges at the widest part of the gathering and shearing slot.

The effectiveness of the shearing largely depends not only upon the sharpness of the shearing edges of the shearing slot, but also upon the shearing angle α (FIG. 4c). The optimal size of the shearing angle α is 10 degrees. The effectiveness of fruit-trapping depends upon the trapping angle β (FIG. 4c). The optimal size of the trapping angle β is 65 degrees (for the cutters 1, 2) and 55 degrees (for the cutters 3, 4).

Figure 4:
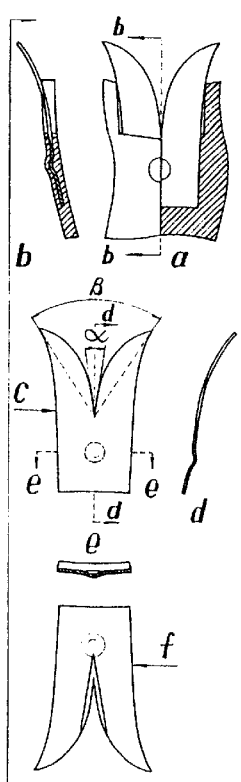
Figure 5:
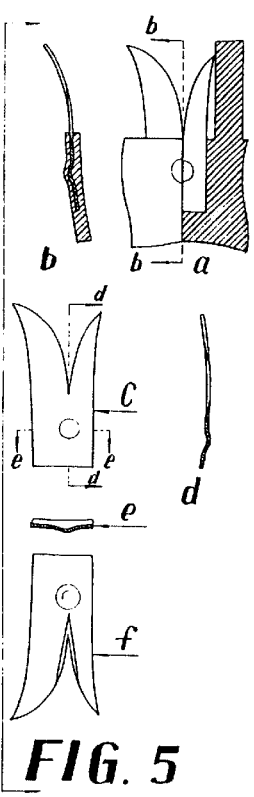

The four pairs of cutters each have a stem or base portion bent to match the curve of the cage and each having a convex protrusion (male fitting) on the side of the stem facing outward and a concave hollow (female fitting) on the opposite side facing innards to allow it to be fitted into its built-in case on the corner or along the edge of the opening FIG. 1, FIG. 4, FIG. 5 to keep it stable and, at the same time, to enable it to be removed from the case, e.g. to be sharpened. The inside cheeks of the shearing edges of the cutters FIG. 4f, FIG. 5f are slanted innards and the outside cheeks FIG. 4c, FIG. 5c coincide with the outside surface of the cutters in order to be able to grip and shear the cherry stems with the most oblique section as is possible.

The sides at the upper part of the right cutter 4 and of the left cutter 3, FIG. 5d, are curved to match the curve of the cage to avoid obstructions.

The four pairs of cutters are arranged with the base portion of cutter 2 inserted in a built-in case at the top apex of the opening, directing the gathering and shearing slot towards the tele-handle to pick the fruit by pulling the tele-handle downwards or innards with the opening turning upwards or sideways; with the base portion of cutter 1 inserted in a built-in case at the middlemost point of the lower edge of the opening, directing the shearing slot towards the top of the cage to pick the fruit by pushing the tele-handle upwards or outward with the opening turning upwards or even downwards; with the base portion of cutter 4 inserted in a built-in case FIG. 5a at the right corner of the opening, directing the shearing slot towards the top of the cage to pick the fruit by pushing the tele-handle upwards or outward with the opening turning sideways and forwards to the left; with the base portion of cutter 3 inserted in a built-in case at the left corner of the opening, directing the shearing slot towards the top of the cage to pick the fruit by pushing the tele-handle upwards or outward with the opening turning sideways and forwards to the right.

The lower cutter 1 is shown in detail in FIGS. 4a–f. The lower cutter is used when the opening is turned upwards or downwards to pick the fruits in this position by pushing the tele-handle upwards or outward. The upper cutter 2 and the lower cutter 1 are identical except that they differ from each other in the way their base portions are bent to match the curve of the cage FIG. 4e. The upper cutter 2 is used when the opening is turned upwards or sideways to pick the fruits in this position by pulling the tele-handle downwards or innards.

The right cutter 4 is shown in detail in FIGS. 5a–f. The right cutter 4 is used when the opening is turned sideways and forwards to the left to pick the fruit in this position by pushing the tele-handle upwards or outward. The left cutter is a mirror image of the right cutter 4. The left cutter 3 is used when the opening is turned sideways and forwards to the right to pick the fruit in this position by pushing the tele-handle upwards or outward.

All of the four pairs of cutters are made of razor silver steel or steel of corresponding sharpness.

In order to assure the rigidity of the cage and, at the same time, to save material, the thickness of the wall of the cage is not even: the front part (roughly half of the surface) is thicker than the remaining part as shown in FIG. 3a.

The plastic cage has at its bottom end a built-in bolt nut for combination with a built-in bolt on the head of the tele-handle. The combination is secured against coming off by a leaf spring washer 6.

Figure 7:
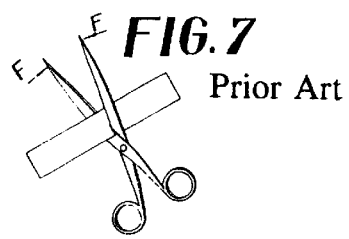
FIG. 7 is an illustration of the principle of scissor-action shearing with a pair of normal scissors.

FIG. 7 illustrates a pair of normal scissors in operation to cut a sheet of paper. By pushing both handles of the scissors together, two opposite squeezing forces F are applied on the two shearing edges and the sheet of paper is cut into two. Scissor-action shearing by use of normal scissors FIG. 7 results from the two opposite squeezing forces without the reactive force supplied by the object being sheared.

Figure 8:
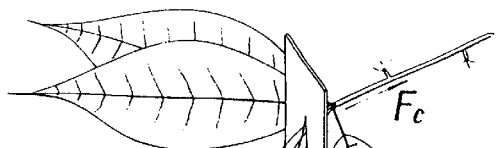
FIG. 8 is an illustration of the principle of shearing with the upper cutter of this invention when picking the cherries by pulling the tele-handle.
Figure 9:
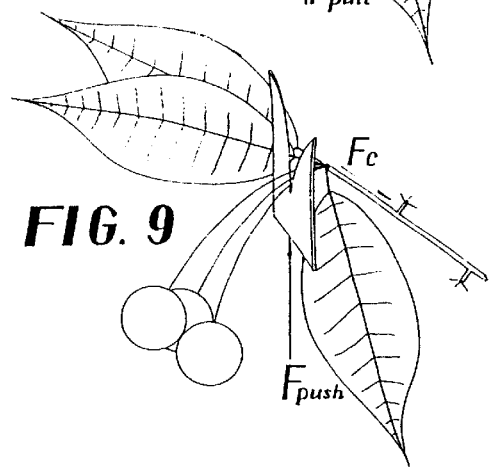
FIG. 9 is an illustration of the principle of shearing with the lower cutters when picking the cherries by pushing the tele-handle.

FIG. 8 illustrates an operative state of picking cherries in the case of the cherry branch being bent down. Fpull is a user's pulling force. Fc is a contracting force produced by a cherry stem (or branch). FIG. 9 illustrates an operative state of picking cherries in the case of the cherry branch being bent up. Fpush is a user's pushing force and Fc is the contracting force produced by the cherry stem (or branch).

Figure 6B:
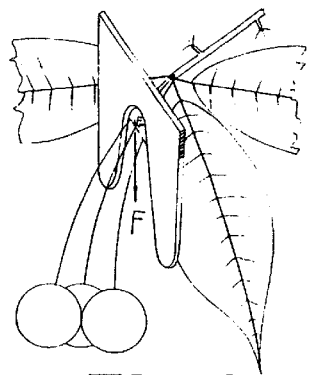
FIG. 6b is an illustration of an absolutely impossible situation for prior art devices because of their structural disadvantages and knife-action cutting.
Figure 6A:
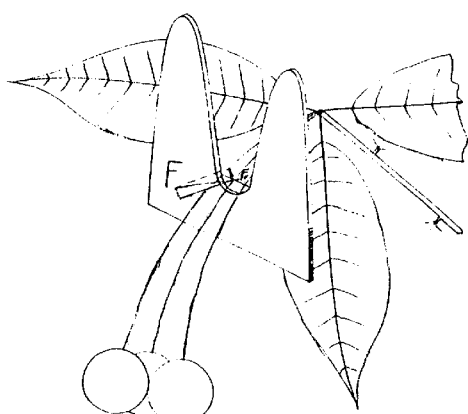
FIG. 6a is an illustration of the prior art principle of cutting with a knife.

FIG. 6a and FIG. 6b illustrate the contrary case: picking cherries with a knife is impossible. Cutting by use of a knife results from a one-sided cutting force and a reactive force supplied by the object being cut. The cutting force F FIGS. 6a, b is great, but the reactive force Fr of a cherry stem (or branch) is very small, near to zero. The knife slides on the cherry stem, because cherry stems are flexible. Cutting them with a knife does not work.

All of the four cutters of this invention are arranged so that the plane of the very acute shearing angle α together with the direction of push upward or pull downward of the tele-handle forms a very acute angle. Thus shearing the cherry (or fruit) stems always results from a mere pulling or pushing force applied by its user and a contracting force supplied by the cherry (or fruit) stems.

By means of the very acute shearing angle α of 10 degrees at the narrowest part of the shearing slot FIG. 4c and its sharp shearing edges, all cherry (or fruit) stems are directly gripped in the shearing angle whenever they get trapped. The user has only to pull or push the tele-handle to achieve the fruit-picking. The condition for picking cherries or other fruits by a tool of this invention is merely the contracting force. The contracting force supplied by the cherry stems, or even by leaf stems of creeping plants can be overcome sufficiently for them to be sheared. For this reason, the new device can pick cherries, grapes and all kinds of other fruits, even medical plants or vegetables of creeping plants (in tropical regions) easily.

Arranging a cutter 2 at the top apex of the equilateral triangle-like opening is another characteristic feature of the new device. In the case of cherries and most other fruits their branches are bent down due to the weight of their fruits. Therefore plucking the cherries FIG. 8 or other fruits in the state of branches being bent down by pulling the tele-handle down is most rational. This solution is most preferable and most frequently used by a user on normal ground.

Arranging a pair of cutters 3 and 4 at the left and at the right corner of the opening is also another characteristic feature of the new device, because sometimes the fruits appear to the left or to the right of the opening and the position required to pick them can only be achieved by turning the cage 90 degrees clockwise or anti-clockwise.

Another characteristic feature of the new device lies in the complex structure of the plastic cage of the five assembled baskets and integral opening with the four pairs of cutters. This complex structure allows the new device to easily pick and safely catch the cherry whatever the position of the tele-handle with the cage turning arbitrarily to any required position with the opening appropriately placed to pick and catch the fruit as its user desires. The general structure of the new device is rigid, it does not dangle, it is aerodynamically shaped and agile and thus it is possible to direct and push the new device into the crown of the fruit tree, coping with such obstructions as close twigs, small branches and leaves, to pick cherries and all other kinds of fruits easily.

The new device functions well even in difficult (in terms of the old devices) positions of the tele-handle and the opening.

1—Vertical position

When the fruits are just above one's head, one can pick them easily with the lower cutter by pushing the tele-handle upwards or with the upper cutters 2 by pulling the tele-handle downwards. The fruits will fall safely into the lower basket I.

2—Horizontal position

When the fruits appear in a horizontal position to the tele-handle, one can pick them easily with the lower cutter 1 by pushing the tele-handle outward or with the upper cutter 2 by pulling the tele-handle innards. The fruits will fall into the horizontal basket V. If the fruits appear to the left of the opening, one can pick them by turning the device 90 degrees anti-clockwise and pick them with the right cutter 4 by pushing the tele-handle outward or with the upper cutter 2 by pulling the tele-handle innards. The fruits will be caught by the left basket III. If, however, the left cutter 3 and the upper cutter 2 do the picking, the right basket 4 will catch the fruits.

3—Position at a 60-degree inclination downward

When the fruits appear in a position where the tele-handle is inclined 60 degrees downwards, one can pick them safely in a similar manner to that mentioned above with the upper 2, lower 1, right 4 and left 3 cutters. In this case, either the upper basket II alone, or the upper basket together with the horizontal basket V or with the left basket III or with the right basket IV, will catch the fruits likewise.

4—Position with the opening turning downward

One characteristic feature of the new device is that it can pick the fruits even in a position where the opening is turned downwards. This is a necessity whenever there are cherries or big apples on large horizontal branches.

As one preferred style of the most practicable universal fruit-picking tool, this invention has been illustrated and described, It is understood that any change in structure, material, size or shape can be made by those skilled in the art without departing from the invention. The invention is deemed according to the following claims.

What is claimed is:

1. A universal fruit-picking tool comprising:
   a tele-handle;
   a plastic cage having a generally elliptical spheroid shape, the cage having
      a closed lower half attached to the tele-handle, and
      an upper half which has a nearly triangular opening formed by three sides, there being a lower horizontal side,
      and two upwardly extending sides joining each other at a top apex near to the top of the cage; and four cutters made of generally flat steel sheet material, each cutter having
- a base portion at one end, and
- a V-shaped gathering and shearing slot at the end opposite the base portion, the shearing portion of the gathering and shearing slot having
  - a very acute shearing angle formed by two sharp shearing edges at narrowest part of the gathering and shearing slot,
  - and a wide trapping angle formed by two convex blunt edges at the widest part of said gathering and shearing slot; and structure for securing the four cutters to the plastic cage adjacent the triangular opening with the cutters being generally parallel to the surface of the cage, one of the four cutters being located adjacent the top apex with the two blunt edges of the V-shaped gathering and shearing slot being below the sharp shearing edges, and three other lower cutters being mounted on the lower horizontal edge, two of the lower three cutters being at the ends of the horizontal edge, and the remaining lower cutter being at the center of the horizontal edge.

2. The universal fruit-picking tool as set forth in claim 1 wherein the very acute angle is 10°.

3. The universal fruit-picking tool as set forth in claim 1 wherein the wide trapping angle is in the range of 55° to 65°.

4. The universal fruit-picking tool as set forth in claim 3 wherein the cutter located at the apex and the cutter at the center of the horizontal edge has a trapping angle of 65°.

5. The universal fruit-picking tool as set forth in claim 3 wherein the lower cutters at the ends of the horizontal edge have a trapping angle of 55°.

6. The universal fruit-picking tool as set forth in claim 1 wherein the structure for securing the four cutters to the plastic cage adjacent the triangular opening includes four cutter receiving receptacles, there being three lower receptacles on the lower horizontal edge, two of the lower receptacles being at the ends of the horizontal edge, and a lower receptacle being at the center of the horizontal edge, and there being an upper cutter receiving receptacle at the top apex opposite the lower receptacle at the center of the horizontal edge, the base portion of the cutters being inserted into the cutter receiving receptacles.

7. The universal fruit-picking tool as set forth in claim 6 wherein the base portion of each cutter has a convex protrusion on one side facing the outer surface of the plastic cage, and wherein the cooperating surface of the four cutter receiving receptacles have a matching concave hollow.

* * * * *